E. M. DEILLER.
FAUCET.
APPLICATION FILED JAN. 27, 1912.

1,093,117.

Patented Apr. 14, 1914.

WITNESSES
Howard P. King
Frances E. N. Blodgett

INVENTOR:
Eugene M. Deiller,
BY
Russell M. Everett,
ATTORNEY.

COLUMBIA PLANOGRAPH CO., WASHINGTON, D. C.

UNITED STATES PATENT OFFICE.

EUGENE M. DEILLER, OF NEWARK, NEW JERSEY.

FAUCET.

1,093,117.  Specification of Letters Patent.  Patented Apr. 14, 1914.

Application filed January 27, 1912. Serial No. 673,796.

*To all whom it may concern:*

Be it known that I, EUGENE M. DEILLER, a citizen of the United States, residing at Newark, in the county of Essex and State of New Jersey, have invented certain Improvements in Faucets, of which the following is a specification.

This invention relates more particularly to faucets for drawing beer or other carbonated beverages under pressure, and the objects of the invention are to provide in such a faucet a ball valve which shall be positively held from abnormal displacement, and left free to seat normally; to provide such means which shall not cause foaming; to secure a seat which shall prevent leakage, and yet not wear unduly; and to obtain other advantages and results as may be brought out in the following description.

Figure 1:
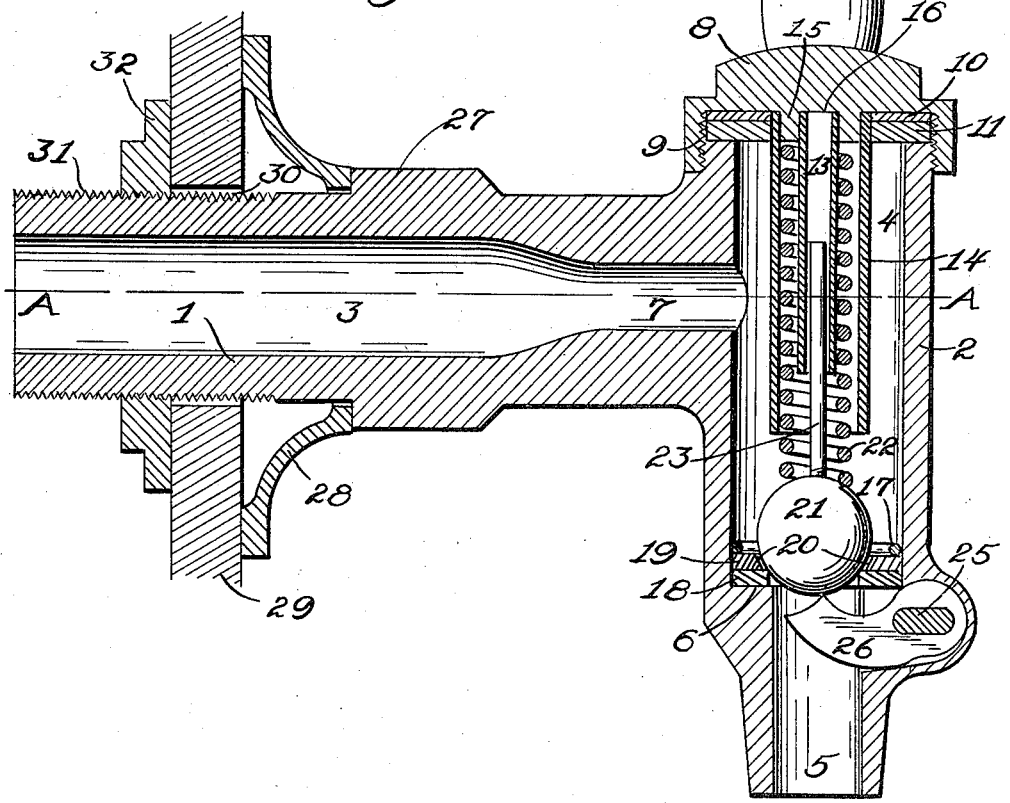
Figure 2:
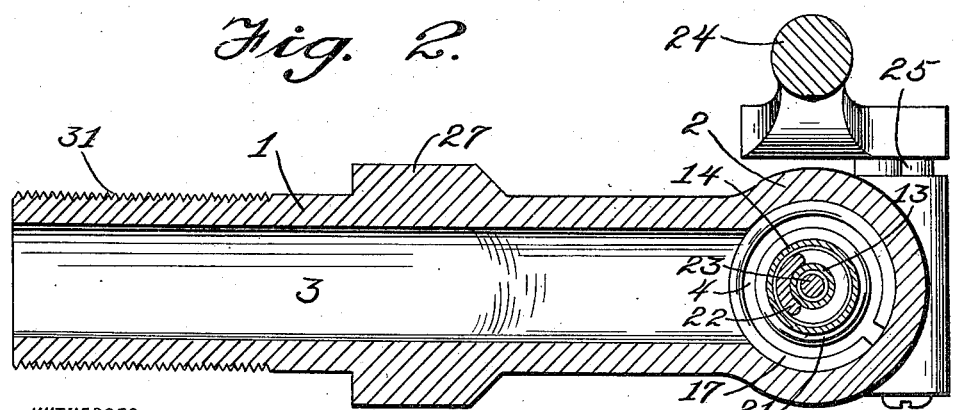

Referring to the accompanying drawings, in which like numerals of reference indicate the same parts throughout the several figures, Figure 1 is a vertical longitudinal section of a faucet embodying my invention, as on line A—A, Fig. 2, and Fig. 2 is a horizontal section on line B—B of Fig. 1, certain mounting parts being removed.

In the specific embodiment of the invention illustrated in said drawings, 1 indicates the horizontal portion of the body of my improved faucet, and 2 indicates the upright portion, said portions preferably being of one integral casting. A flow passage 3 is provided in the horizontal portion opening into a similar passage 4 in the vertical portion 2, the lower end 5 of said passage 4 being reduced to form the shoulder or seat 6. The horizontal passage 3 is preferably narrowed in its vertical diameter at the end next adjacent to the vertical portion 2, as at 7, the object of which is to reduce the pressure in the upright portion when the valve is opened and prevent spitting and undue force of outflow. A head 8 is screwed upon the upper end of the vertical portion 2 by means of threads 9, and washers 10 and 11, preferably of brass or rubber, respectively, prevent leakage at the joint between said head and upright portion. Centrally secured to the inner side of said head by any suitable means are two cylinders 13 and 14 one inside the other, the outside cylinder having a greater diameter and greater length than the inner cylinder 13. These cylinders extend longitudinally of the upright portion 2 of the faucet, or flow passage 4 thereof, in central axial coincidence therewith, and project below the junction of said flow passage with the flow passage of the horizontal portion 2. Preferably the outer cylinder is secured to the head 6 by being forced over a boss 15 thereon, and the inner small cylinder is driven into a socket 16 bored in said boss, as shown.

Upon the shoulder 6 formed by the reduction of the upright flow passage 4, I secure by any suitable means such as the expanding split ring 17, a rubber ring 18, and a superimposed metal ring 19, the said metal ring made preferably of brass with interiorly beveled edges 20 and the rubber ring having the smaller hole therein. The ball 21 normally seats itself upon the rubber ring 18, thereby preventing the passage of any of the liquid. In use the rubber ring will be subject to wear, but eventually the ball 21 will come into contact with the beveled edges 20 of the metal ring 19, and wear upon the rubber ring 18 will cease, but an impervious contact will still be maintained. To hold the ball 21 normally seated, a spring 22 is placed in the annular space between the cylinders 13 and 14, said spring bearing against the top of the ball 21. The outer cylinder 14 insures a clear course for out-flowing liquid through the upright passage 4, preventing it from churning through the coils of the spring, and causing excessive foaming.

To prevent undue displacement or movement of the ball, I screw thereinto, or otherwise secure thereto, a stem 23 to loosely and slidably enter the inner small cylinder 13. This allows sufficient lateral movement of the ball to be properly seated, but retains the same in approximate proper position at the end of the spring 22. A quick and sure closing of the valve results from this, preventing leakage and dripping.

A handle 24 is secured to a short shaft or pin 25 having an arm 26 projecting into the reduced lower part 5 of the upright flow passage 4, and adapted to lift the ball from its seat, as usually employed in the art. Such lifting of the ball will permit a flow of the contained liquid through the reduced portion or spout 5 from whence it may be caught in any suitable retaining vessel.

The horizontal portion 1 preferably has formed therewith an enlargement or shoulder 27, and a washer 28 of any desired shape and ornamental design is adapted to fit against such shoulder, and bear against the wall or bar 29, through which the horizontal portion of the faucet extends. An appropriate hole 30 is bored in said wall or bar to receive the reduced end of the said horizontal portion, and said end is screw-threaded, as at 31, to receive back of the wall 29 a nut 32 which clamps the faucet in place.

Having thus described the invention, what I claim is:

1. In a faucet, the combination of a horizontal flow portion and an upright flow portion, a valve in said upright portion below its junction with the horizontal portion, a spring in the upper part of said upright flow portion engaging the valve to normally seat the same, a cylinder around said spring extending from the upper part of the upright flow portion downward below its junction with the horizontal flow portion, means for opening said valve against said spring, and means inside said spring for preventing displacement of the valve.

2. In a faucet, the combination of a horizontal flow portion and an upright flow portion having a reduced lower end providing an interior shoulder, a ball valve in said upright flow portion, a ring between said ball valve and shoulder having its inner edges beveled to fit said ball, a seat ring of softer material than the first-mentioned ring arranged between said first-mentioned ring and the shoulder, said seat ring having an aperture smaller than that of the first-mentioned ring whereby it will become beveled by wear until it is flush with the bevel of the first-mentioned ring and the two together form a continuous seat for the ball valve, means for holding the first-mentioned ring against movement away from the seat ring, and a rocker arm adapted to displace the ball valve from its seat.

3. In a faucet, a body portion having horizontal and upright flow portions with flow passages therein, the flow passage of the horizontal portion being reduced at the end thereof which opens into the upright flow passage, a ball valve in said upright flow passage below its communication with the horizontal flow passage, a rocker arm beneath said ball valve, a spring in the upper part of said upright flow passage engaging the ball valve to seat the same, and a cylinder around said spring extending from the upper part of the upright flow portion downward below the horizontal flow portion.

EUGENE M. DEILLER.

Witnesses:
CORNELIUS ZABRISKIE,
HOWARD P. KING.

---

Copies of this patent may be obtained for five cents each, by addressing the "Commissioner of Patents, Washington, D. C."